March 8, 1955  F. K. H. NALLINGER  2,703,680
MOTOR VEHICLE HEATING SYSTEM
Filed Sept. 30, 1949  2 Sheets-Sheet 2

INVENTOR
Friedrich K. H. Nallinger

BY Dicke and Padlon
ATTORNEY

United States Patent Office 2,703,680
Patented Mar. 8, 1955

2,703,680

MOTOR VEHICLE HEATING SYSTEM

Friedrich K. H. Nallinger, Stuttgart, Germany

Application September 30, 1949, Serial No. 118,734

Claims priority, application Germany October 1, 1948

14 Claims. (Cl. 237—8)

This invention relates to a heating system for motor power vehicles, particularly to the control mechanism for such heating system. It is an object of the present invention to provide for an economic, agreeable and adaptable heating system for the passengers of the motor vehicle. One feature of the present invention accordingly consists in that the heating is automatically controlled depending on the condition of the heated medium, for example, fresh air. The temperature or pressure of the heated medium or of the heating air or also both quantities may serve as controlling factors in that case. Controlling may further be effected in such a manner that, e. g., with a substantially constant or varying quantity of cooling air, the relative distribution of the heated cooling air, e. g., into ventilation air discharged into the external air, on the one hand, and into heating air used for heating, on the other, is varied depending on the demand of heat or depending on the condition of the heated air and of the heating air by controlling the total quantity of the heated cooling air, by means of a blower capable of being controlled by an adjustable shutter or the like.

A further object of the invention is to provide for a type of heater depending on the cooling system so that the cooling of the motor is not affected by the heater.

The invention also relates in particular to the idea that control of the heating effect is in as simple and suitable a fashion as possible made dependent upon the condition of the heating air and especially in that the fresh air heated by the motor cooling system is separated into a portion to be used for heating and another portion to be discharged into the air depending upon the condition of the heated air. This can be most readily done depending upon the pressure of the heated air in a manner that at raised pressure an increased amount of heated air is discharged into the exterior of the vehicle.

Accordingly it is an additional object of the invention, to provide for the control of heated air by means of separation of the heated air masses using a simultaneous control of the total amount of air flowing through the cooler depending upon the temperature of the motor cooling medium. Thus any harmful effect by the heat control on maintaining the motor heat may be counteracted.

Additional characteristics of the invention relate to advantageous feeding of heated air into the car especially by conducting air through the floor from where it enters the car's interior, for instance, near the doors.

According to further characteristics of the invention, the heat exchanger which heats the heating air or heating medium is merely part of the entire cooling device of the motor in which in particular the portion used for heating is constantly in contact with the cooling fluid stream, whereas the other portion of the stream is short-circuited or may be cut off.

According to another characteristic of the invention, for the cooler used as heat exchanger in the heating process, merely a regular blower may be provided.

It is furthermore particularly convenient and generally of considerable importance in this case to provide simultaneously a control of the rate of flow of the cooling air through the cooler, e. g., depending upon the temperature of the coolant, so that in order to maintain the thermal state of the engine both the circulation of the coolant and the quantity of cooling air is controlled. This is effected for example by a thermostat which controls, on the one hand, the circulation of the coolant, e. g., by opening or closing by-pass conduit short-circuiting the cooler or part of the cooling system, and, on the other hand, the quantity of cooling air, e. g., by a shutter, simple throttling means provided in the cooling air conduit or also by means of a blower capable of being controlled. Controlling of the blower or of the ventilator is effected in this case, for example, by controlling the speed or by adjusting the guide blades and the impeller blades respectively of the blower. The blower may be designed as an axial or radial flow blower and further as a single-stage or multi-stage blower. For controlling the blower drive conveniently, a variable friction gear or a similar gear suitable for this purpose may be used.

Another feature of the present invention consists in that only part of the cooling means serving for the exchange of heat between engine coolant and cooling air, e. g., only one of a plurality of coolers or one of plurality of cooler stages is utilized for heating, especially for the transfer of heat to the medium employed for heating, e. g., to the cooling air supplying the heating air.

In that case preferably that part of the re-cooling device used for purposes of heating is so dimensioned as to permit the utilization of the entire waste heat of this part of the re-cooling device for purposes of heating, the dimensions of this re-cooling device being therefore only as large as is necessary to obtain a maximum effect of the heating system of the car. If the heating system is turned off, this part of the re-cooling device is conveniently further used to re-cool the coolant. If provision is made to control the circulation of the engine coolant in such a manner that part of the re-cooling device may be cut out from the coolant circulation, conveniently that part of the re-cooling device is used for heating the vehicle which permanently forms part of the circulation system, while depending on the demand of cooling of the engine, e. g., depending upon the temperature of the coolant the remaining part of the re-cooling device may be effective only for a time and may be automatically cut out by a thermostat.

Every one of the coolers or cooler stages may be provided with a particular blower associated therewith in which case the blower supplying the heating air may be capable of being controlled, while it is expedient to provide only said last mentioned blower with such control means.

The heating system may be controlled effectively directly in response to the demand of heat by controlling the same in dependence as the actual instantaneous condition of the heated air as it exists either within the heating conduit or after it has already escaped into the interior of the car body.

Some forms of embodiment of the invention are diagrammatically illustrated in the accompanying drawings, in which.

Figure 1:
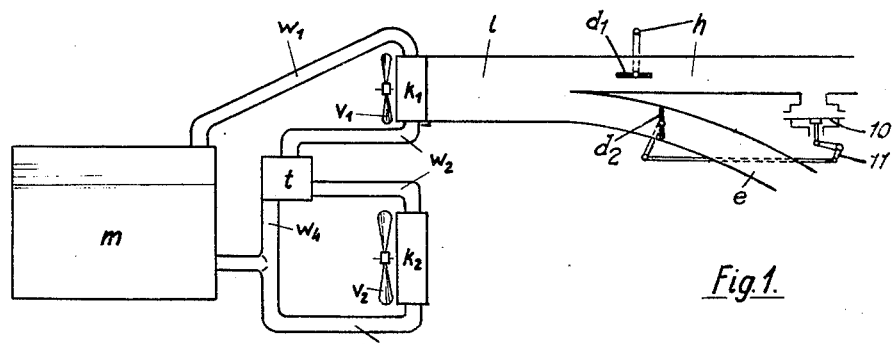
Fig. 1 is an engine cooling and car heating system with two separate coolers in the coolant circulation system of the engine.

Reference is made now to Fig. 1 in which the warm cooling water is conducted from the engine $m$ through the conduit $w1$ to the cooler $k1$ and from there through the conduit $w2$ to the cooler $k2$ and from the latter through the conduit $w3$ back to the engine. In the conduit $w2$ a thermostat $t$ is provided which at a low temperature of the cooling water, in a manner known as such, conducts the cooling water, instead to the cooler $k2$, more or less through the by-pass conduit $w4$ directly back to the engine. In front of each of the two coolers $k1$ and $k2$ there is a ventilator or blower $v1$ or $v2$ respectively forcing the cooling air through the cooler. The blower $v1$ delivers the air heated in the cooler $k1$ into a conduit 1 branching off into a conduit $h$ and a conduit $e$. The conduit $h$ serves in this case as a heating conduit which leads, e. g., into the double-walled floor of the car body and from there into the interior of the car body or, e. g., after passing a throttle, such as throttle $d4$ of Figure 4, into the external air, while the conduit $e$ serving as a ventilation conduit discharges, e. g., directly into the external air. In the conduits $h$ and $e$ throttle valves $d1$ and $d2$ are provided.

Controlling may now be effected, for instance, in such a manner that the valve $d1$ may be adjusted manually, for example, into the open or closed position or also into any intermediate position, while the valve $d2$ opens and closes automatically depending on the pressure of the heated air. For this purpose the last mentioned throttle plate or valve $d2$ may be loaded by a spring counteracting the pressure of the air coming from the cooler $k1$. Valve $d2$ may be actuated also by a barometric cell or the like having a membrane 10 which is exposed to the pressure in the conduit 1 or preferably in the heating conduit $h$ and which is connected with valve $d2$ through linkage 11 in such a manner that with increasing pressure in $l$ or $h$ the throttle $d2$ automatically opens. On closing the throttle $d1$ the throttle $d2$ opens automatically every time the ventilator or blower $v1$ is in operation.

Provision may be made also for a common manual actuation of $d1$ and $d2$ in such a manner that on closing of $d1$ the valve $d2$ opens and vice versa. In that case controlling of the heating effect is effected, e. g., by controlling the ventilator or blower $v1$ which control, however, may also be used additionally in those cases where the throttles $d1$, $d2$ or the like are controlled automatically. For this purpose the ventilator or blower may be provided with adjustable blades which are adjusted depending on the pressure or the temperature in the conduits $l$ and $h$ respectively or in dependence of the temperature of the cooling water, e. g., by the thermostat $t$. Instead of by means of adjustable blades a corresponding control may be provided by varying the number of revolutions of the blower, e. g., by means of an automatically varying friction gear or by the application of a similar conveniently infinitely variable-speed transmission. There may also be provided in the blower conduit, in substitution or additionally, anterior or posterior to the blower and the cooler respectively, adjustable shutters serving to control the rate of air-flow, such as a throttle plate or the like.

The cooling system comprises, as already mentioned, the two coolers $k1$ and $k2$, the cooler $k1$ being continuously in action, the cooler $k2$, however, being more or less effective only with an increased demand of the engine, i. e., in the cases where the cooling of the cooling water by the cooler $k1$ is not sufficient and the temperature in the conduit $w2$ is comparatively high. For reasons of simplicity it is convenient that the ventilator and the blower $v2$ respectively are not capable of being controlled. It is also possible to actuate, e. g., the throttle valve $d2$ or corresponding control means in dependence on the temperature of the cooling water as, for example, by the thermostat $t$.

Figure 2:
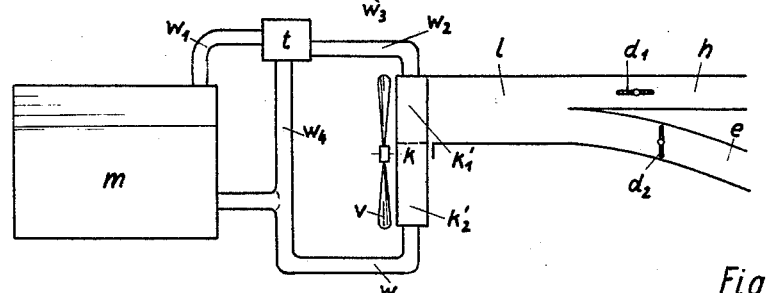
Figs. 2 and 3 show a similar system with a single cooler of which, however, only part is utilized for the exchange of heat to a medium.

The arrangement according to Fig. 2 differs from that of Fig. 1 only in that the cooler stages $k1$ and $k2$ are combined to form a single cooler of conventional design or also as a compressed air cooler. A single ventilator and a single blower respectively delivers the cooling air through the two stages of the cooler.

Figure 3:
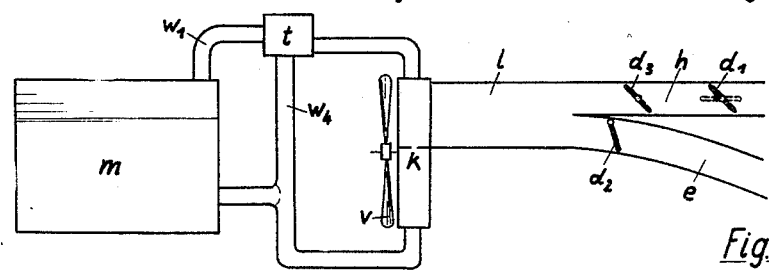

The arrangement according to Fig. 3 corresponds to that of Fig. 2, except that two throttle members $d1$ and $d3$ are provided in the heating conduit $h$. The throttle $d1$ in this case again is arbitrarily adjusted by hand, while the throttle $d3$ is automatically actuated in response to the conditions of the heated air in the conduit $l$ or $h$ respectively. The adjustment of throttle $d3$ may be effected, for instance, depending upon the temperature of the heated air, and eventually depending upon the temperature of the air in the interior of the car body, e. g., by means of a thermostat located in the conduit or at any other suitable place. The throttle $d2$ in the ventilation conduit which controls the escape or discharge of the air directly into the external air or atmosphere, is again conveniently adjusted by the pressure of the air in the conduit $l$ and may for this purpose again be loaded by a spring or a weight. With increasing temperature of the heated air and of the heating air respectively, the throttle $d3$ closes in that case, while an increasing pressure actuates the throttle $d2$ in the opening direction. Of course, the adjustment of the throttle $d3$ may be effected also by the pressure and the adjustment of throttle $d2$ by the temperature. There further exists the possibility of automatically adjusting the two throttles either individually or in common in dependence on the temperature or pressure or also on both quantities. As a substitution for two throttle valves common throttle or pilot members at the branching point of both conduits $h$ and $e$ may be provided.

Figure 4:
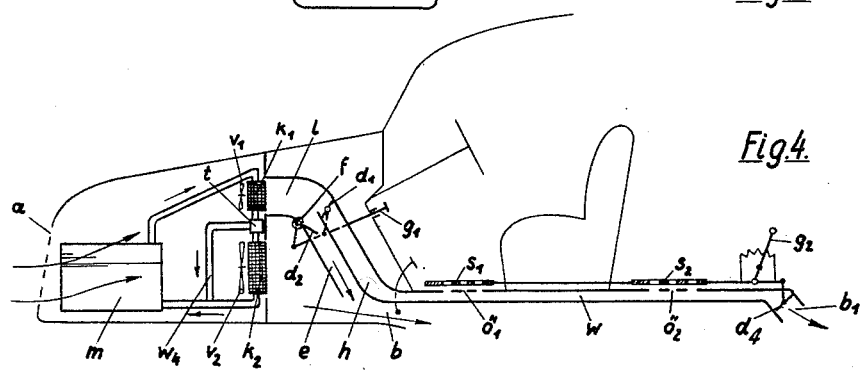
Fig. 4 is a system similar to that of Fig. 1 illustrating the heating of the car.

In the embodiment of the present invention according to Fig. 4, for instance, two coolers $k1$ and $k2$ are provided for re-cooling the cooling water for the engine $m$. A blower or ventilator $v1$ and $v2$ respectively is arranged in front of each cooler. In the conduit from $k1$ to $k2$ a thermostat $t$ is arranged which, at a low temperature of the cooling water conducts the cooling water, serving as a primary coolant, through the circulation conduit $w4$ directly back to the engine, and at a higher temperature more or less to the cooler $k2$. The ventilator $v1$ may be controllable as to its performance, e. g., depending on the temperature of the cooling water, for instance, by means of a speed reducer arranged in the drive of the ventilator or by adjusting the ventilator blades or the like. The cooling air, serving as a secondary coolant and entering at $a$, escapes into the external air at $b$ inasmuch as it served for the exchange of heat in the cooler $k2$. The cooling air serving for the exchange of heat in the cooler $k1$ is conducted into a conduit $l$ branching off, as described hereinabove, into a ventilation conduit $e$ and into a heating conduit $h$. A throttle member $d2$ controls in this case again the ventilation conduit $e$ and a throttle member $d1$ the heating conduit $h$. Both these throttle members are connected to a common linkage $g1$ capable of being actuated, e. g., from the position of driver in such a manner that on opening of $d2$ the throttle member $d1$ closes thereby providing for ventilation or vice versa to provide for heating. The throttle valve $d2$ may in this case be connected to the linkage, e. g., by a spiral spring $f$ or the like so that on exceeding a predetermined maximum pressure in the conduit $l$, the throttle valve $d2$ assumes a position to provide an enlarged passage area. It is also possible to adjust the linkage $g1$ automatically, e. g., depending on the temperature of the heating air and of the air in the interior of the car body respectively. The air entering the conduit $e$ escapes separately or in common at $b$ with the air flowing through the cooler $k2$ into the external air.

The heating conduit $h$ leads to the car body, e. g., into the double-walled body floor $w$ which may be heated in this way. The hot air is permitted in this case to escape at $b1$ into the external air or through openings $ö1$ and $ö2$ respectively into the interior of the car body in the vicinity of the feet of the passengers. In order to permit changing between wall heating and the more effective heating with fresh air a linkage $g2$ may be provided which, on the one hand, adjusts the slide valves $s1$ and $s2$ respectively and, on the other, the throttle plate $d4$ in such a manner that on opening the outflow openings $ö1$ and $ö2$ for the fresh air and the throttle plate $d4$ for the outflow into the external air is closed and vice versa. The adjustment may, of course, also be effected automatically, e. g., also in connection with a control by the linkage $g1$.

Figure 5:
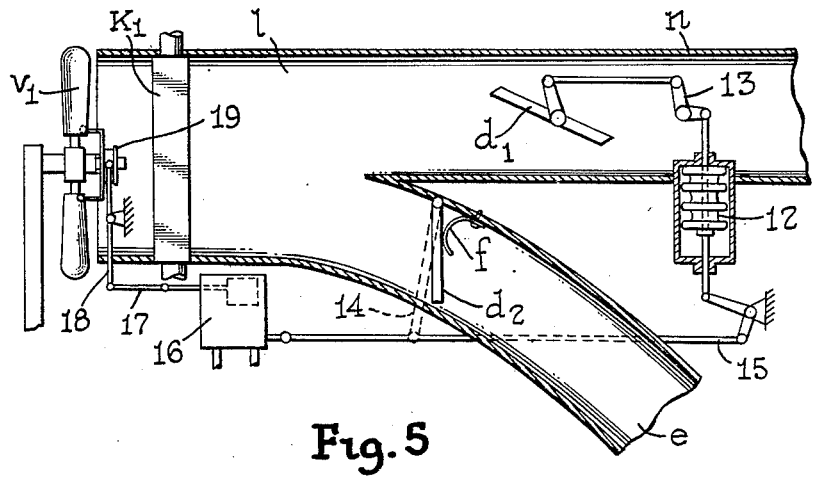
Fig. 5 shows details relating to the construction shown in Fig. 2.

In the embodiment of Figure 5, throttle valve $d1$ which operates in dependence on the temperature in conduit $h$ is controlled by thermostat 12 through linkage 13 in a manner that with rising temperature of the heating air the throttle valve $d1$ is closed. Throttle valve $d2$ in that case is operated by the pressure in conduit $l$ in that it can more or less be opened thereby against the effect of spring $f$. However, throttle valve $d2$ may also be adjusted in dependence on the temperature by thermostat 12 in such a manner that with rising temperature throttle valve $d2$ is opened or closed in a sense contrary to the throttle valve $d1$, for example, by a lever 14, schematically indicated in Figure 5, which is connected to linkage 15 of the thermostat. Linkage 15, for example, is also connected with a servo device 16 which displaces linkage 17 and therewith a lever 18 by servo power such as oil under pressure. Lever 18 in turn acts on a shifting sleeve 19 for shifting the blades of blower $v1$.

Figure 6:
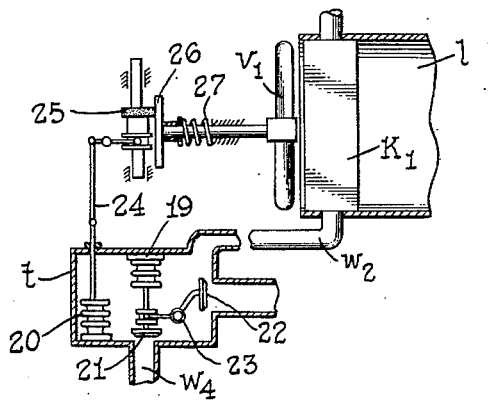
Fig. 6 is a modification showing the temperature control means for alternately diverting the flow of air through the system.

Figure 6 shows a control arrangement of the blower $v1$ in dependence on the cooling water temperature. The thermostat housing *t* contains in the illustrated embodiment two thermostats 19 and 20, such thermostat 19 controls valves 21 and 22 which alternately operate conduits *w*4 and *w*2, and which control valves are connected with each other, for instance, by a swinging lever 23. Thermostat 20 acts on a movable friction wheel 25 of a friction wheel gear by means of linkage 24. Friction wheel 25, mounted on a drive shaft, and driven by the combustion engine, is in frictional engagement with disc 26 of the friction wheel gear, and may, according to its adjustment by thermostat 20, operate along greater or smaller diameters of friction disc 26. Spring 27 constantly urges friction wheel 26 against friction disc or wheel 25. Shifting of friction wheel 25 provides a continuously variable control of the rotational speed of blower *v*1, in a manner that with rising water cooling temperature blower *v*1 is rotated at greater speed.

Regulation of valves 21 and 22 is effected in the usual manner in that with rising temperature of the cooling water the short-circuit *w*4 is closed, while the conduit *w*2 leading to the cooler *k*2 is gradually opened.

It is also noted that the thermostats 19 and 20 may be united into one, if so desired. Furthermore, friction wheel gear 25, 26 may be operated through the intermediary of a servo system.

Furthermore, details of Figure 4 may also be used in connection with the control arrangements embodied in the other figures. The different manners of control may be combined with each other whereby a control may be obtained which is still more adapted to all of the requirements and which ultimately result in a more uniform heating. The single features of each embodiment of the present invention may also be exchanged with those of the other embodiments. As the single elements of the linkage and of the control means are of conventional design, they are not or only partially represented in their details in the drawings.

While this description has reference to particular forms of the invention it will be obvious that various other forms and modifications may be resorted to without departing from the scope of the invention.

What I claim is:

1. A motor vehicle heating system comprising a heat exchanger adapted to transfer the waste heat of the engine to a current of air, heated air discharge means for heating the interior of the car body by the heated current of air, a conduit for conducting the heated current of air from the heat exchanger to the heated air discharge means, a branch conduit for conducting the heated current of air from the heat exchanger directly into the external air, a throttle member in the conduit leading to the heated air discharge means, a throttle member in the branch conduit, and control means adapted to adjust each of said two throttle members depending on the condition of the heated current of air whereby on closing of one of the throttle members the other throttle member opens and vice versa.

2. A motor vehicle heating system according to claim 1, in which at least one of the throttle members is adjustable by the pressure of the heated air.

3. A motor vehicle heating system with a device for re-cooling by heat exchange the primary coolant cooling the engine arranged in the vicinity of the engine outside of the car body, and having partial cooling means so arranged that said partial cooling means are consecutively traversed by the primary coolant comprising a partial cooling device for transferring heat from the primary coolant to a secondary coolant with means for conducting the secondary coolant into a part of the vehicle to be heated for heating the same, another partial cooling device for further transferring of heat from the primary engine coolant to the secondary coolant, and means for guiding the secondary coolant heated by the second partial cooling device to dissipate its heat directly into the external air.

4. A motor vehicle heating system according to claim 3 in combination with control means for cutting out said another partial cooling device not used in heating the vehicle from the re-cooling circulation for the primary engine coolant.

5. A motor vehicle heating system in connection with the engine of said vehicle comprising a heat exchanging device, means in connection with the heat exchanging device for transferring the waste heat of the engine to air for heating the car body of said vehicle, heat discharge means for transferring the heat of the heated air into the interior of said car body, conduit means in connection with the heat discharge means for conducting the heated air from the heat exchanging device, and control means for automatically controlling the heating effect of the heat discharge means depending on the condition of the heated air, said control means having a pilot member for distributing the heated air to the conduit leading to the heat discharge means.

6. A motor vehicle heating system according to claim 5, in which the control means comprise a blower to deliver the heating medium, capable of being controlled and in which controlling of the blower delivery is effected depending on the condition of the heated air.

7. A motor vehicle heating system according to claim 5, in combination with a cooling device for cooling the engine by means of a cooling liquid transferring the waste heat of the engine in the heat exchanging device to the heating medium, and control means for controlling both the circulation of the cooling liquid and the heat exchanging effect of the heating device depending on the temperature of the cooling liquid.

8. A motor vehicle heating system according to claim 5, in which the heat exchanging device constitutes part of a re-cooling device for the engine coolant and that part of the re-cooling device effecting the exchange of heat to the heating medium is substantially continuously traversed by the coolant, the remaining part of the re-cooling device, however, being passed by the coolant only temporarily if there is an increased demand of cooling.

9. A motor vehicle heating system according to claim 5, with cooling means for the engine of which said heat exchanging device constitutes a part, in combination with air delivering devices for the medium absorbing the waste heat in said heat exchanger, the control means comprising a control device for the air delivering device which delivers that part of the medium which is available for heating.

10. The combination according to claim 9, having a substantially constant output air delivering device for the passage of cooling air thereto, said cooling air being used for non-heating purposes.

11. A motor vehicle heating system comprising in combination, a heat exchange unit, water conducting means in communication with the engine of the vehicle, bifurcated air conduit means in the vehicle adapted selectively to conduct air into the vehicle and into the atmosphere, said heat exchange unit comprising cooler means in the line of entry of air into said conduit means, ventilator blower means in line with and ahead of the cooler means for forcing air through the cooler means and into the bifurcated conduit, thermostatic means in said water conducting means for automatically controlling the heating effect of the heat exchange means, and selectively operable throttle means in each of the bifurcations of the air conduit means for heating of the interiors of the vehicle through one of the bifurcations and when the vehicle is heated to a desired temperature discharging air into the atmosphere through the other bifurcation.

12. A motor vehicle heating system comprising in combination, a heat exchange unit, water conducting means in communication with the engine of the vehicle, bifurcated air conduit means in the vehicle adapted selectively to conduct air into the vehicle and into the atmosphere, said heat exchange unit comprising cooler means in the line of entry of air into said conduit means, ventilator blower means in line with the cooler means for forcing air through the cooler means and into the bifurcated conduit, thermostatic means in said water conducting means for automatically controlling the heating effect of the heat exchange means, and selectively operable throttle means in each of the bifurcations of the air conduit means for heating of the interiors of the vehicle through one of the bifurcations and when the vehicle is heated to a desired temperature for discharging air into the atmosphere through the other bifurcation.

13. A motor vehicle heating system utilizing the waste heat of the engine thereof comprising heat exchange means, fluid conducting means interconnecting the engine and said heat exchange means, additional conducting means connected to said heat exchange means for conducting air heated by the fluid in said heat exchange means to thereby absorb heat from the fluid in said heat exchange means, heated air discharge means connected with said additional conducting means for transferring the heat of the conducted air into the vehicle body, control means for automatically controlling the heating effect of said discharge means, said control means depending on the pressure of the heated fluid, and return means for conducting the fluid to the engine.

14. A motor vehicle heating system according to claim 13, wherein said discharge means conducts the stream of air used to heat the inside of the vehicle from the floor of the vehicle into the vehicle body.

References Cited in the file of this patent

UNITED STATES PATENTS

| Number | Name | Date |
|---|---|---|
| 1,409,072 | Vincent | Mar. 7, 1922 |
| 1,676,021 | Gould | July 3, 1928 |
| 1,878,496 | Gulyban | Sept. 20, 1932 |
| 2,009,823 | Van Vulpen et al. | July 30, 1935 |
| 2,090,013 | Van Vulpen | Aug. 17, 1937 |
| 2,105,193 | Kysor | Jan. 11, 1938 |
| 2,213,018 | Perkins | Aug. 27, 1940 |
| 2,236,476 | Findley | Mar. 25, 1941 |
| 2,264,945 | Le Fevre | Dec. 2, 1941 |
| 2,322,054 | Parsons | June 15, 1943 |
| 2,332,149 | Horton | Oct. 19, 1943 |
| 2,454,511 | Heymann | Nov. 23, 1948 |

FOREIGN PATENTS

| Number | Country | Date |
|---|---|---|
| 95,419 | Sweden | Apr. 13, 1939 |